(12) United States Patent
Guo et al.

(10) Patent No.: US 9,361,028 B2
(45) Date of Patent: Jun. 7, 2016

(54) SYSTEMS AND METHODS FOR INCREASING RESTORE SPEEDS OF BACKUPS STORED IN DEDUPLICATED STORAGE SYSTEMS

(71) Applicant: Symantec Corporation, Mountain View, CA (US)

(72) Inventors: Fanglu Guo, Los Angeles, CA (US); Weibao Wu, Vadnais Heights, MN (US); Satyajit Gorhe Parlikar, Shoreview, MN (US); Yun Yang, Beijing (CN)

(73) Assignee: Veritas Technologies, LLC, Mountain View, CA (US)

( * ) Notice: Subject to any disclaimer, the term of this patent is extended or adjusted under 35 U.S.C. 154(b) by 231 days.

(21) Appl. No.: 13/889,191

(22) Filed: May 7, 2013

(65) Prior Publication Data

US 2014/0337591 A1 Nov. 13, 2014

(51) Int. Cl.
*G06F 12/00* (2006.01)
*G06F 3/06* (2006.01)
*G06F 11/14* (2006.01)

(52) U.S. Cl.
CPC .......... *G06F 3/0613* (2013.01); *G06F 11/1453* (2013.01); *G06F 11/1469* (2013.01); *G06F 11/1456* (2013.01); *G06F 2201/81* (2013.01)

(58) Field of Classification Search
CPC .................... G06F 3/0613; G06F 11/1456
USPC ........................................................ 711/162
See application file for complete search history.

(56) References Cited

U.S. PATENT DOCUMENTS

| | | | |
|---|---|---|---|
| 7,567,188 B1 | 7/2009 | Anglin et al. | |
| 7,594,085 B1 | 9/2009 | Rao | |
| 8,041,907 B1 * | 10/2011 | Wu et al. | 711/161 |
| 8,108,446 B1 | 1/2012 | Christiaens | |
| 8,108,447 B2 | 1/2012 | Guo | |
| 8,224,874 B2 | 7/2012 | Guo et al. | |
| 8,224,875 B1 | 7/2012 | Christiaens et al. | |
| 8,307,176 B1 | 11/2012 | Wu et al. | |

(Continued)

OTHER PUBLICATIONS

Deepak Patil, et al.; Systems and Methods for Preserving Deduplication Efforts After Backup-Job Failures; U.S. Appl. No. 13/917,761, filed Jun. 14, 2013.

(Continued)

*Primary Examiner* — Adam M Queler
*Assistant Examiner* — Trang Ta
(74) *Attorney, Agent, or Firm* — ALG Intellectual Property, LLC

(57) ABSTRACT

A computer-implemented method for increasing restore speeds of backups stored in deduplicated storage systems may include (1) identifying a backup that includes data stored in at least one data container within a deduplicated storage system, (2) detecting a subsequent backup that includes additional data, (3) calculating an amount of duplication between the additional data included in the subsequent backup and the data stored in the data container, (4) determining that the amount of duplication between the additional data and the data stored in the data container is below a predetermined threshold, (5) identifying at least one additional data container to store the additional data instead of deduplicating the additional data with respect to the data container, and then (6) storing the additional data in the additional data container to facilitate increasing a restore speed of the subsequent backup. Various other methods, systems, and computer-readable media are also disclosed.

19 Claims, 7 Drawing Sheets

(56) References Cited

U.S. PATENT DOCUMENTS

| | | |
|---|---|---|
| 8,392,376 B2 | 3/2013 | Guo |
| 8,504,529 B1 * | 8/2013 | Zheng et al. ............... 707/679 |
| 8,712,976 B1 | 4/2014 | Chen et al. |
| 8,732,403 B1 * | 5/2014 | Nayak ........................ 711/135 |
| 2007/0043734 A1 | 2/2007 | Cannon et al. |
| 2010/0250549 A1 | 9/2010 | Muller et al. |
| 2011/0167096 A1 | 7/2011 | Guo et al. |
| 2012/0036113 A1 | 2/2012 | Lillibridge et al. |
| 2012/0233417 A1 * | 9/2012 | Kalach et al. ............... 711/162 |
| 2013/0036298 A1 * | 2/2013 | De Atley et al. ............... 713/1 |
| 2013/0080403 A1 * | 3/2013 | Yamakawa ............... 707/690 |
| 2013/0110784 A1 | 5/2013 | Guo et al. |
| 2013/0254402 A1 | 9/2013 | Vibhor et al. |
| 2014/0025917 A1 * | 1/2014 | Kaczmarczyk ..... G06F 11/1448 711/173 |

OTHER PUBLICATIONS

Neel Bhatt, et al.; Systems and Methods for Managing References in Deduplicating Data Systems; U.S. Appl. No. 13/915,072, filed Jun. 11, 2013.

Xianbo Zhang, et al.; U.S. Appl. No. 13/646,852, filed Oct. 8, 2012.

Xianbo Zhang; U.S. Appl. No. 13/250,156, filed Sep. 30, 2011.

"Data Domain Deduplication Storage Systems", http://www.emc.com/data-protection/data-domain/data-domain-deduplication-storage-systems.htm, as accessed Mar. 20, 2013, EMC Corporation, (On or before Mar. 20, 2013).

"Data Domain Protection Storage for Backup and Archive Data", http://www.emc.com/domains/datadomain/index.htm, as accessed Mar. 20, 2013, EMC Corporation, (Jul. 20, 2012).

"CommVault", http://www.commvault.com/, as accessed Mar. 20, 2013, (Dec. 2, 1998).

* cited by examiner

SYSTEMS AND METHODS FOR INCREASING RESTORE SPEEDS OF BACKUPS STORED IN DEDUPLICATED STORAGE SYSTEMS

BACKGROUND

Deduplicated storage systems are often used to reduce the amount of storage space needed to store backup images by identifying redundant data patterns included in the backup images. For example, a backup and restore technology may capture a backup image of a client device and identify various data patterns included in both the backup image and one or more data containers within a deduplicated storage system. In this example, rather than storing multiple instances of the data patterns to the deduplicated storage system, the backup and restore technology may configure the backup image to simply reference the data patterns already included the data containers within the deduplicated storage system. By configuring the backup image to reference the data patterns already included in the data containers, the backup and restore technology may reduce the amount of storage space needed to store the backup image in the deduplicated storage system.

Unfortunately, while conventional backup and restore technologies may reduce the amount of storage space needed to store backup images in deduplicated storage systems, such backup and restore technologies may also have certain shortcomings and/or inefficiencies. In one example, as the number of backup images stored to a deduplicated storage system increases, the speed at which a conventional backup and restore technology is able to restore the later backups may decrease in dramatic fashion. For example, the conventional backup and restore technology may achieve a restore speed of up to 1 gigabyte per second while restoring the first backup stored to the deduplication storage system. However, the conventional backup and restore technology may reach a restore speed of only 33 megabytes per second while restoring the $25^{th}$ backup stored to the deduplication storage system.

What is needed, therefore, are systems and methods for increasing the restore speeds of backups stored to deduplicated storage systems.

SUMMARY

As will be described in greater detail below, the instant disclosure generally relates to systems and methods for increasing restore speeds of backups stored in deduplicated storage systems by storing duplicate instances of certain data during backup operations and/or prefetching certain data during restore operations.

In one example, a computer-implemented method for increasing restore speeds of backups stored in deduplicated storage systems may include (1) identifying a backup that includes data stored in at least one data container within a deduplicated storage system, (2) detecting a subsequent backup that includes additional data that is identical to at least a portion of the data stored in the data container, (3) calculating an amount of duplication between the additional data included in the subsequent backup and the data stored in the data container, (4) determining that the amount of duplication between the additional data included in the subsequent backup and the data stored in the data container is below a predetermined threshold, (5) identifying at least one additional data container within the deduplicated storage system to store the additional data included in the subsequent backup instead of deduplicating the additional data with respect to the data stored in the data container, and then (6) storing the additional data in the additional data container within the deduplicated storage system to facilitate increasing a restore speed of the subsequent backup.

In some examples, the method may also include detecting a request to restore the subsequent backup to a client device. In such examples, the method may further include prefetching at least a portion of the subsequent backup from the deduplicated storage system in response to detecting the request to restore the subsequent backup to the client device.

In some examples, the method may also include identifying a data container that includes a plurality of data extents included in the subsequent backup. In such examples, the method may further include determining that a subset of the data extents are adjacent to one another within the data container. Additionally or alternatively, the method may include caching the subset of adjacent data extents upon determining that the subset of data extents are adjacent to one another.

In some examples, the method may also include determining that another subset of the data extents are adjacent to one another within the data container. In such examples, the method may further include caching the other subset of adjacent data extents upon determining that the other subset of data extents are adjacent to one another.

In some examples, the method may also include identifying a starting point of at least one data extent and an ending point of at least one other data extent included in the subsequent backup within the data container. In such examples, the method may further include calculating a differential between the starting point of the data extent and the ending point of the other data extent within the data container. Additionally or alternatively, the method may include determining that the differential between the starting point of the data extent and the ending point of the other data extent is below a predetermined threshold.

In some examples, the method may also include reading the subset of adjacent data extents from the data container with a single read operation. In such examples, the method may further include storing the subset of adjacent data extents in a cache accessible to the client device.

In some examples, the method may also include reading a portion of data that is not needed to restore the subsequent backup from the data container with the single read operation. In such examples, the method may further include discarding the unneeded portion of data instead of storing the unneeded portion of data in the cache.

In some examples, the method may also include detecting a restore operation performed by a restore application in response to the request to restore the subsequent backup to the client device. In such examples, the method may further include directing the restore application to search the cache for the subset of data extents included in the subsequent backup instead of reading the subset of data extents from the data container within the deduplicated storage system.

In some examples, the method may also include detecting a need of the restore application to read the subset of data extents while the restore application is performing the restore operation. In such examples, the method may further include directing the restore application to search the cache for the subset of data extents included in the subsequent backup instead of reading the subset of data extents from the data container within the deduplicated storage system.

In some examples, the method may also include determining that the restore application has read the subset of data extents from the cache while performing the restore operation. In such examples, the method may further include removing the subset of data extents from the cache in response to determining that the restore application has read the subset of data extents from the cache.

In some examples, the method may also include comparing the additional data included in the subsequent backup with the data stored in the data container. In such examples, the method may further include determining that the portion of data stored in the data container is identical to the additional data included in the subsequent backup.

In some examples, the method may also include determining that the portion of data stored in the data container that is identical to the additional data included in the backup is below the predetermined threshold. In such examples, the method may further include maintaining duplicate instances of data across the data container and the additional data container within the deduplicated storage system to facilitate increasing the restore speed of the subsequent backup. Additionally or alternatively, the method may include reducing an amount of data containers needed to restore the subsequent backup by storing all of the additional data in the additional data container since the amount of duplication is below the predetermined threshold.

In one embodiment, a system for implementing the above-described method may include (1) an identification module programmed to identify a backup that includes data stored in at least one data container within a deduplicated storage system, (2) a detection module programmed to detect a subsequent backup that includes additional data that is identical to at least a portion of the data stored in the data container, (3) a calculation module programmed to calculate an amount of duplication between the additional data included in the subsequent backup and the data stored in the data container, (4) a determination module programmed to determine that the amount of duplication between the additional data included in the subsequent backup and the data stored in the data container is below a predetermined threshold, (5) wherein the identification module is further programmed to identify an additional data container within the deduplicated storage system to store the additional data included in the subsequent backup in response to the determination that the amount of duplication is below the predetermined threshold, and (6) a storage module programmed to store the additional data in the additional data container within the deduplicated storage system to facilitate increasing a restore speed of the subsequent backup. The system may also include at least one processor configured to execute the identification module, the detection module, the calculation module, the determination module, the creation module, and the storage module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a backup that includes data stored in at least one data container within a deduplicated storage system, (2) detect a subsequent backup that includes additional data that is identical to at least a portion of the data stored in the data container, (3) calculate an amount of duplication between the additional data included in the subsequent backup and the data stored in the data container, (4) determine that the amount of duplication between the additional data included in the subsequent backup and the data stored in the data container is below a predetermined threshold, (5) identify an additional data container within the deduplicated storage system to store the additional data included in the subsequent backup instead of deduplicating the additional data with respect to the data stored in the data container, and then (6) store the additional data in the additional data container within the deduplicated storage system to facilitate increasing a restore speed of the subsequent backup.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
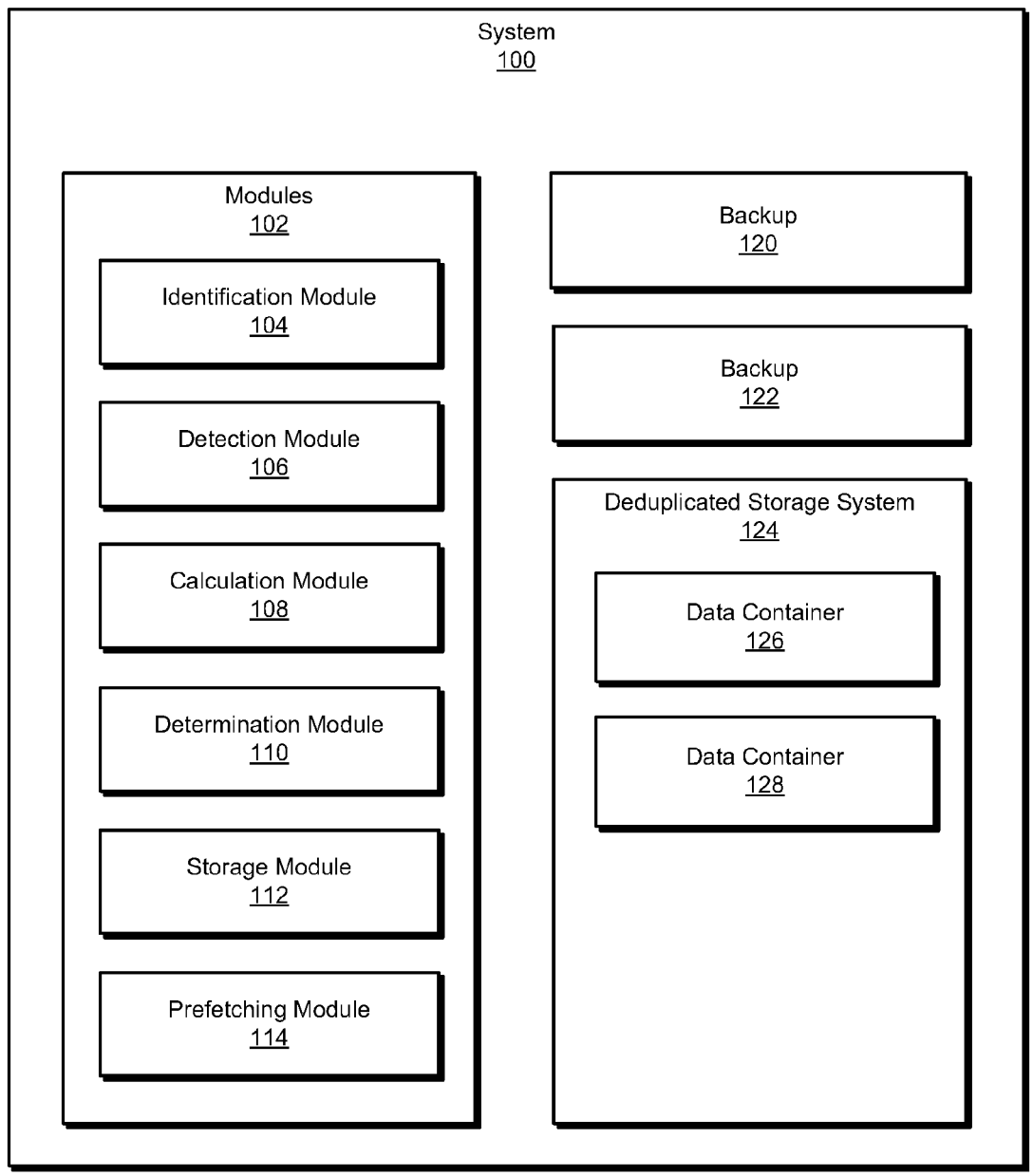
FIG. 1 is a block diagram of an exemplary system for increasing restore speeds of backups stored in deduplicated storage systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for increasing restore speeds of backups stored in deduplicated storage systems. As will be explained in greater detail below, by calculating the amount of duplication (sometimes referred to as container utilization) between a backup and a previously used data container within a deduplicated storage system, the various systems and methods described herein may selectively store at least a portion of the backup as duplicate data in a new data container in the event that the amount of duplication between the backup and the previously used data container is below a predetermined threshold. By selectively storing the portion of the backup as duplicate data in the new data container in the event that the amount of duplication between the backup and the previously used data container is below the predetermined threshold, the various systems and methods described herein may increase the storage efficiency of the data containers storing the data included in the backup within the deduplicated storage system.

In addition, by increasing the storage efficiency of the data containers storing the data included in the backup within the deduplicated storage system, the various systems and methods described herein may reduce the number of data containers needed to restore the backup from the deduplicated storage system. By reducing the number of data containers needed to restore the backup from the deduplicated storage system, the various systems and methods described herein may increase the restore speed of the backup.

Moreover, by prefetching adjacent portions of the backup from a data container within the deduplicated storage system during a restore operation, the various systems and methods described herein may reduce the number of read operations needed to restore the backup from the deduplicated storage system. By reducing the number of read operations needed to restore the backup from the deduplicated storage system, the various systems and methods described herein may increase the restore speed of the backup.

As will be explained in greater detail below, by combining these techniques upon backing up and restoring the backup, the various systems and methods described herein may achieve unexpected and/or unpredictable increases in the restore speed of the backup. For example, by implementing only the technique of selectively storing duplicate data in the event that the amount of duplication between the backup and the previously used data container is below a predetermined threshold, the various systems and methods described herein may increase the restore speed of the backup from 33 megabytes per second (MB/sec) to 77 MB/sec.

In another example, by implementing only the technique of prefetching adjacent portions of the backup from the data container within the deduplicated storage system during the restore operation, the various systems and methods described herein may increase the restore speed of the backup from 33 MB/sec to 140 MB/sec. However, by combining the techniques of selectively storing duplicate data during the backup operation and prefetching adjacent portions of the backup during the restore operation, the various systems and methods described herein may increase the restore speed of the backup from 33 MB/sec to 600 MB/sec (an increase of approximately 18-fold).

Figure 2:
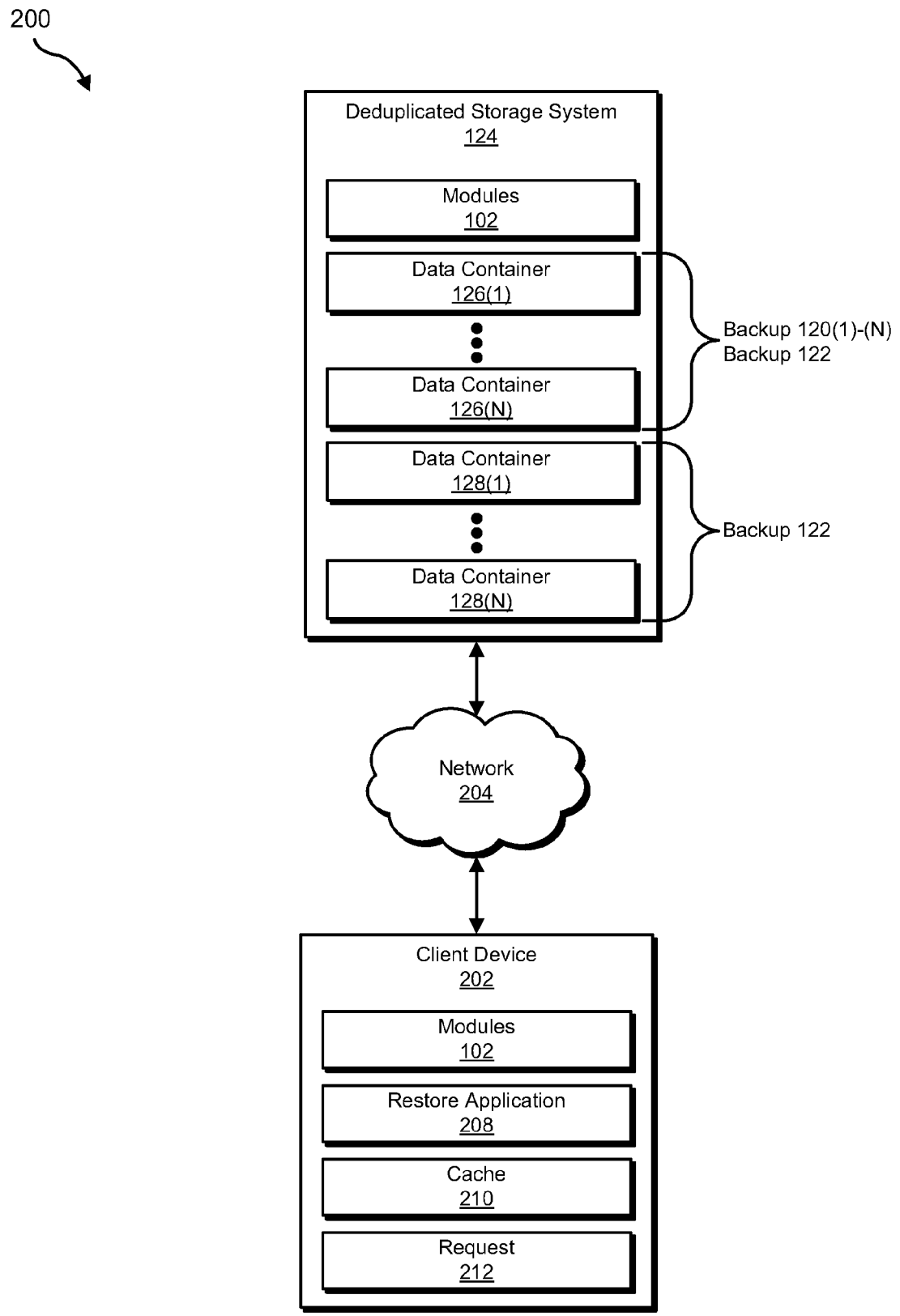
FIG. 2 is a block diagram of an exemplary system for increasing restore speeds of backups stored in deduplicated storage systems.

The following will provide, with reference to FIGS. 1-2, detailed descriptions of exemplary systems for increasing restore speeds of backups stored in deduplicated storage systems. Detailed descriptions of corresponding computer-implemented methods will be provided in connection with FIG. 3. Detailed descriptions of an exemplary data container and an exemplary backup will be provided in connection with FIG. 4. Detailed descriptions of a plurality of exemplary data extents included in a data container will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for increasing restore speeds of backups stored in deduplicated storage systems. As illustrated in this figure, exemplary system 100 may include one or more modules 102 for performing one or more tasks. For example, and as will be explained in greater detail below, exemplary system 100 may include an identification module 104 programmed to identify a backup that includes data stored in at least one data container within a deduplicated storage system. Exemplary system 100 may also include a detection module 106 programmed to detect a subsequent backup that includes additional data that is identical to at least a portion of the data stored in the data container.

In addition, and as will be described in greater detail below, exemplary system 100 may include a calculation module 108 programmed to calculate an amount of duplication between the additional data included in the subsequent backup and the data stored in the data container. Exemplary system 100 may further include a determination module 110 programmed to determine that the amount of duplication between the additional data included in the subsequent backup and the data stored in the data container is below a predetermined threshold.

Moreover, exemplary system 100 may include a storage module 112 programmed to store the additional data in an additional data container within the deduplicated storage system to facilitate increasing a restore speed of the subsequent backup. Exemplary system 100 may also include a prefetching module 114 programmed to prefetch at least a portion of the subsequent backup from the deduplicated storage system in response to a request to restore the subsequent backup to the client device. Although illustrated as separate elements, one or more of modules 102 in FIG. 1 may represent portions of a single module or application (such as SYMANTEC BACKUP EXEC or SYMANTEC NETBACKUP).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., client device 202 and/or deduplicated storage system 124), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more backups, such as backups 120 and 122. The term "backup," as used herein, generally refers to any type or form of physical or virtual disk image that includes all or a portion of the data located on a computing device and/or a storage device at a specific point in time. In one example, backup 120 may represent at least a portion of the data located on a computing device at a specific point in time. In this example, backup 122 may represent at least a portion of the data located on the computing device at a subsequent point in time.

As illustrated in FIG. 1, exemplary system 100 may also include a deduplicated storage system, such as deduplicated storage system 124. The phrase "deduplicated storage system," as used herein, generally refers to any type or form of storage device and/or mechanism capable of deduplicating data included in backups and/or storing such deduplicated data in data containers. In one example, deduplicated storage system 124 may include data containers 126 and 128. In this example, data containers 126 may include at least a portion of backup 120. Additionally or alternatively, data container 128 may include at least a portion of backup 122.

Exemplary system 100 may also include one or more databases (not illustrated in FIG. 1). In one example, a database may be configured to store any data, metadata, and/or information used to facilitate increasing restore speeds of backups stored in deduplicated storage system 124. For example, a database included in deduplicated storage system 124 may store data containers 126 and 128. In this example, the database included in deduplicated storage system 124 may also store metadata that identifies each data container that includes data corresponding to backups 120 and 122.

Such databases may represent portions of a single database or computing device or a plurality of databases or computing devices. For example, as indicated above, a database may represent a portion of deduplicated storage system 124 in FIGS. 1 and 2, client device 202 in FIG. 2, computing system 610 in FIG. 6, and/or portions of exemplary network architecture 700 in FIG. 7. Alternatively, the database may represent one or more physically separate devices capable of being accessed by a computing device, such as deduplicated storage system 124 in FIGS. 1 and 2, client device 202 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a client device 202 in communication with a deduplicated storage system 124 via a network 204. Client device 202 may be programmed with one or more of modules 102. Client device 202 may also include a restore application 208 capable of performing a restore operation on client device 202. Examples of restore application 208 include, without limitation, SYMANTEC BACKUP EXEC, SYMANTEC NETBACKUP, SYMANTEC NORTON GHOST, ACRONIS TRUE IMAGE, ACRONIS BACKUP & RECOVERY, GENIE BACKUP HOME, COMMVAULT SIMPANA, and/or any other suitable restore application.

Additionally or alternatively, deduplicated storage system 124 may be programmed with one or more of modules 102 and include a cache 210 capable of storing one or more data extents (e.g., one or more of data extents 400-406 in FIG. 4) and/or facilitating access by restore application 208 to such data extents during the restore operation. Deduplicated storage system 124 may also include data containers 126(1)-(N) capable of storing data that correspond to one or more of backups 120(1)-(N) and 122. Deduplicated storage system 124 may further include additional data containers 128(1)-(N) capable of storing additional data included in subsequent backup 122. As will be described in greater detail below, Deduplicated storage system 124 may include duplicate data stored across one or more of data containers 126(1)-(N) and one or more of data containers 128(1)-(N).

In some embodiments, deduplicated storage system 124 may include one or more other data containers (not illustrated in FIG. 2) capable of storing data that correspond to one or more other backups (not illustrated in FIG. 1 or 2). For example, backup 120 may represent a backup of client device 202 stored to deduplicated storage system 124 after one or more other backups of client device 202 had already been stored to deduplicated storage system 124. In this example, backup 122 may represent the very next backup of client device 202 that followed backup 120 in being stored to deduplicated storage system 124.

In one embodiment, one or more of modules 102 from FIG. 1 may, when executed by at least one processor of client device 202 and/or deduplicated storage system 124, facilitate client device 202 and/or deduplicated storage system 124 in increasing restore speeds of backups stored in deduplicated storage systems. For example, and as will be described in greater detail below, one or more of modules 102 may cause client device 202 and/or deduplicated storage system 124 to (1) identify backup 120 that includes data stored in data container 126 within deduplicated storage system 124, (2) detect subsequent backup 122 that includes additional data that is identical to at least a portion of the data stored in data container 126, (3) calculate an amount of duplication between the additional data included in subsequent backup 122 and the data stored in one or more of data containers 126(1)-(N), (4) determine that the amount of duplication between the additional data included in subsequent backup 122 and the data stored in the one or more of data containers 126(1)-(N) is below a predetermined threshold, (5) identify one or more of additional data containers 128(1)-(N) within deduplicated storage system 124 to store the additional data included in subsequent backup 122 instead of deduplicating the additional data with respect to the data stored in the one or more of data containers 126(1)-(N), and then (6) store the additional data in the one or more of additional data containers 128(1)-(N) within deduplicated storage system 124 to facilitate increasing a restore speed of subsequent backup 122.

Client device 202 generally represents any type or form of computing device capable of reading computer-executable instructions. Examples of client device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between client device 202 and deduplicated storage system 124.

Figure 3:
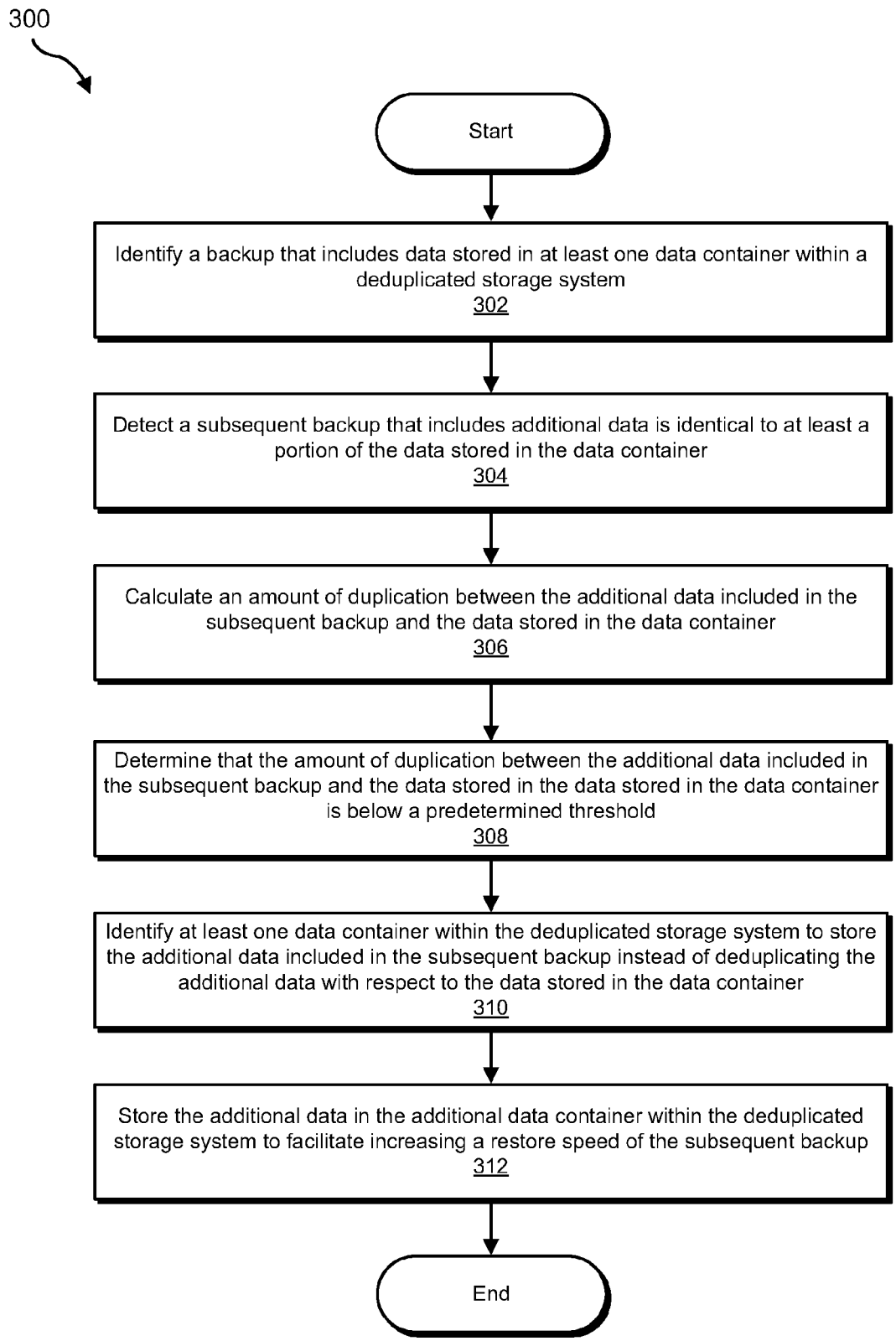
FIG. 3 is a flow diagram of an exemplary method for increasing restore speeds of backups stored in deduplicated storage systems.

FIG. 3 is a flow diagram of an exemplary computer-implemented method 300 for increasing restore speeds of backups stored in deduplicated storage systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a backup that includes data stored in at least one data container within a deduplicated storage system. For example, at step 302 identification module 104 may, as part of client device 202 and/or deduplicated storage system 124 in FIG. 2, identify backup 120 that includes data stored in data containers 126(1)-(N) within deduplicated storage system 124. In this example, backup 120 may represent a backup of the data located on client device 202 at a specific point in time.

The various systems described herein may perform step 302 in a variety of ways. In one example, identification module 104 may identify backup 120 as at least a portion of the data included in backup 120 is deduplicated with respect to at least one existing data container within deduplicated storage system 124. For example, a backup application (such as SYMANTEC BACKUP EXEC or SYMANTEC NETBACKUP) may capture backup 120 during a backup operation performed on client device 202. In this example, upon performing the backup operation on client device 202, the backup application may deduplicate at least a portion of backup 120 with respect to data container 126(1) within deduplicated storage system 124. Identification module 104 may identify backup 120 while the backup application is deduplicating the portion of backup 120 with respect to data container 126(1).

In one example, identification module 104 may identify backup 120 as at least a portion of the data included in backup 120 is stored in a newly created data container within deduplicated storage system 124. For example, upon performing the backup operation on client device 202, the backup application may create data container 126(N) within deduplicated storage system 124 and then store at least a portion of backup 120 in data container 126(N). In this example, identification module 104 may identify backup 120 while the backup application is storing the portion of backup 120 in data container 126(N).

In one example, identification module 104 may identify backup 120 after all of the data included in backup 120 has been stored in deduplicated storage system 124. For example, upon performing the backup operation on client device 202, the backup application may deduplicate at least a portion of backup 120 with respect to data container 126(1) and/or store at least a portion of backup 120 in data container 126(N). In this example, identification module 104 may identify backup 120 after the backup application has deduplicated and/or stored the portion(s) of backup 120.

Figure 4:
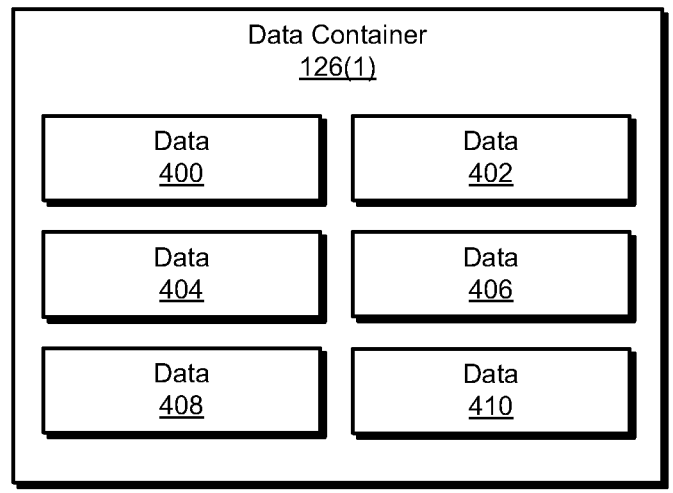
FIG. 4 is an illustration of an exemplary data container and an exemplary backup.
Figure 4:
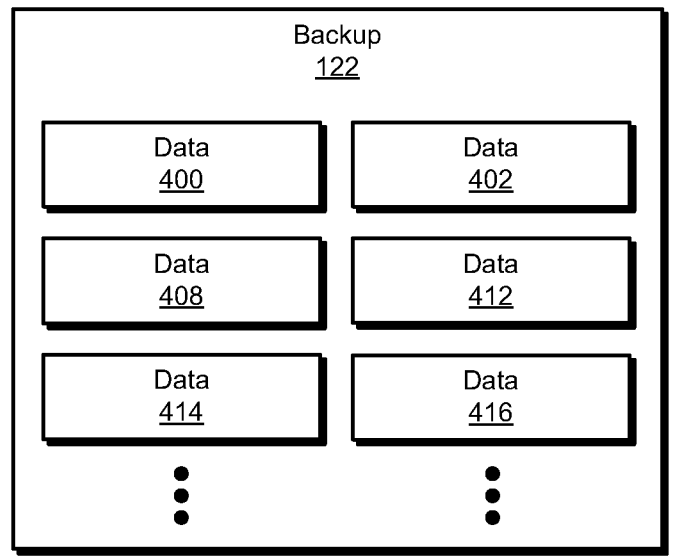

As illustrated in FIG. 4, data container 126(1) may store various pieces of data (in this example, "data 400," "data 402," "data 404," "data 406," "data 408," and "data 410") within deduplicated storage system 124. In one example, data 400, 402, 404, and 408 stored in data container 126(1) may correspond to backup 120. In this example, data 406 and 410 stored in data container 126(1) may correspond not to backup 120 but, rather, to one or more previous backups (not illustrated in FIG. 1 or 2). In other words, backup 120 may include data 400, 402, 404, and 408 and exclude data 406 and 410 stored in data container 126(1) within deduplicated storage system 124.

As illustrated in FIG. 3, at step 304 one or more of the systems described herein may detect a subsequent backup that includes additional data that is identical to at least a portion of the data stored in the data container. For example, at step 304 detection module 106 may, as part of client device 202 and/or deduplicated storage system 124 in FIG. 2, detect subsequent backup 122 that includes additional data that is identical to at least a portion of the data stored in data containers 126(1)-(N). In this example, subsequent backup 122 may represent a backup of the data located on client device 202 at a subsequent point in time (i.e., after the specific point in time represented by backup 120).

The various systems described herein may perform step 304 in a variety of ways. In one example, detection module 106 may detect subsequent backup 122 as at least a portion of subsequent backup 122 is captured on client device 202. For example, the backup application may capture subsequent backup 122 during a subsequent backup operation performed on client device 202. In this example, detection module 106 may detect subsequent backup 122 while the backup application is performing the subsequent backup operation on client device 202.

In one example, detection module 106 may detect subsequent backup 122 after subsequent backup 122 is captured on client device 202. For example, detection module 106 may detect subsequent backup 122 after the backup application has performed the subsequent backup operation on client device 202.

In one example, detection module 106 may detect subsequent backup 122 before at least a portion of subsequent backup 122 is deduplicated with respect to in data containers 126(1)-(N) and/or stored to deduplicated storage system 124. For example, upon performing the subsequent backup operation on client device 202, the backup application may prepare to deduplicate at least a portion of subsequent backup 122 with respect to data containers 126(1)-(N). In this example, detection module 106 may detect subsequent backup 122 as the backup application is preparing to deduplicate the portion of subsequent backup 122 with respect to data containers 126(1)-(N).

In some examples, detection module 106 may detect subsequent backup 122 based at least in part on evidence indicating that subsequent backup 122 has been or will soon be captured on client device 202. In one example, detection module 106 may detect a request from the backup application to deduplicate at least a portion of subsequent backup 122 with respect to data containers 126(1)-(N) and/or store at least a portion of subsequent backup 122 to deduplicated storage system 124. In another example, detection module 106 may detect a request from an application (such as an operating system) running on client device 202 or deduplicated storage system 124 to initiate the subsequent backup operation performed by the backup application.

As illustrated in FIG. 4, subsequent backup 122 may include various pieces of data (in this example, "data 400," "data 402," "data 408," "data 412," "data 414," and "data 416"). In one example, subsequent backup 122 may include one or more pieces of data that are identical to at least a portion of the data stored in data containers 126(1)-(N) within deduplicated storage system 124. For example, subsequent backup 122 in FIG. 4 may include the same data 400, 402, and 408 stored in data container 126(1) in FIG. 4. In this example, subsequent backup 122 in FIG. 4 may also include data 412, data 414, and data 416, which are not stored in data container 126(1) in FIG. 4 (but may be stored in one or more other data containers not illustrated in FIG. 4).

As illustrated in FIG. 3, at step 306 one or more of the systems described herein may calculate an amount of duplication between the additional data included in the subsequent backup and the data stored in the data container. For example, at step 306 calculation module 108 may, as part of client device 202 and/or deduplicated storage system 124 in FIG. 2, calculate an amount of duplication (sometimes referred to as container utilization) between the additional data included in subsequent backup 122 and the data stored in at least one of data containers 126(1)-(N). In this example, the amount of duplication may represent the percentage or ratio of data stored in at least one of data containers 126(1)-(N) that is identical to the additional data included in subsequent backup 122.

As will be described in greater detail below in connection with FIG. 4, the phrases "amount of duplication" and "container utilization," as used herein, generally refer to the amount of data stored in a data container that is identical to data included in a backup relative to the total amount of data stored in the data container. In some examples, the phrases "amount of duplication" and "container utilization," as used herein, may refer to the amount of data stored in a data container that would be referenced or otherwise used by a backup if the backup were deduplicated with respect to the data container. As such, the phrases "amount of duplication" and "container utilization" may be used interchangeably herein to describe the systems and methods of the instant disclosure.

The various systems described herein may perform step 306 in a variety of ways. In one example, calculation module 108 may compare the additional data included in subsequent backup 122 with the data stored in data container 126(1). For example, calculation module 108 may compare data 400, 402, and/or 408 included in backup 122 in FIG. 4 with data 400, 402, 404, 406, 408, and/or 410 stored in data container 126(1) in FIG. 4. In this example, upon performing this comparison, calculation module 108 may determine data 400, 402, and 408 are included in subsequent backup 122 in FIG. 4 and stored in data container 126(1) in FIG. 4.

In one example, calculation module 108 may determine the portion of the data stored in data container 126(1) that is included backup 122. For example, calculation module 108 may determine that data 400, 402, and 408 represent ½ or 50% of all of the data (e.g., data 400, 402, 404, 406, 408, and/or 410) stored in data container 126(1) in FIG. 4. In other words, calculation module 108 may determine that the amount of duplication between the additional data included in subsequent backup 122 and the data stored in data container 126(1) is ½ or 50% of all of the data stored in data container 126(1).

In some examples, the backup application (and/or one or more of modules 102) may search deduplicated storage system 124 for one or more data containers storing at least a portion of data that is identical to the additional data included in subsequent backup 122. For example, the backup application may generate a hash of each of data 400, 402, and/or 408. In this example, the backup application may compare the hashes of data 400, 402, and/or 408 with a database or hash table that includes a hash of each data pattern stored in data containers 126(1)-(N) within deduplicated storage system 124. The backup application may then determine that each of data 400, 402, and 408 are stored in data container 126(1) based at least in part on this comparison.

In one example, calculation module 108 may calculate another amount of duplication between other data included in subsequent backup 122 and another data container in data containers 126(1)-(N) within deduplicated storage system. For example, calculation module 108 may compare the other data included in subsequent backup 122 with the other data container in data containers 126(1)-(N). In this example, calculation module 108 may determine that the other amount of duplication between the other data included in subsequent backup 122 and the other data container in data containers 126(1)-(N) is 59% of all of the data stored in other data container.

As illustrated in FIG. 3, at step 308 one or more of the systems described herein may determine that the amount of duplication between the additional data included in the subsequent backup and the data stored in the data container is below a predetermined threshold. For example, at step 308 determination module 110 may, as part of client device 202 and/or deduplicated storage system 124 in FIG. 2, determine that the amount of duplication between the additional data included in subsequent backup 122 and the data stored in at least one of data containers 126(1)-(N) is below a predetermined threshold. In this example, the predetermined threshold may include any type or form of amount (e.g., a percentage or ratio) used as a comparative measurement for determining whether to deduplicate the additional data included in subsequent backup 122 with respect to data containers 126(1)-(N) or store the additional data as duplicate data in one or more new data containers.

The various systems described herein may perform step 308 in a variety of ways. In one example, determination module 110 may identify the predetermined threshold. For example, determination module 110 may locate the predetermined threshold in a database within deduplicated storage system 124. In this example, upon locating the predetermined threshold, determination module 110 may determine that the predetermined threshold is 60%.

In one example, determination module 110 may compare the amount of duplication between the additional data included in subsequent backup 122 and the data stored in data container 126(1) with the predetermined threshold. For example, determination module 110 may compare the amount of duplication calculated at 50% with the predetermined threshold of 60%. In this example, determination module 110 may then determine that the amount of duplication calculated at 50% is below the predetermined threshold of 60%.

In one example, determination module 110 may also compare the other amount of duplication between the other data included in subsequent backup 122 and the other data container in data containers 126(1)-(N) with the predetermined threshold. For example, determination module 110 may compare the other amount of duplication calculated at 59% with the predetermined threshold of 60%. In this example, determination module 110 may then determine that the other amount of duplication calculated at 59% is below the predetermined threshold of 60%.

As illustrated in FIG. 3, at step 310 one or more of the systems described herein may identify at least one additional data container within the deduplicated storage system to store the additional data included in the subsequent backup instead of deduplicating the additional data with respect to the data stored in the data container. For example, at step 310 identification module 104 may, as part of client device 202 and/or deduplicated storage system 124 in FIG. 2, identify additional data containers 128(1)-(N) within deduplicated storage system 124 to store the additional data included in subsequent backup 122 instead of deduplicating the additional data with respect to the data stored in data containers 126(1)-(N). Identification module 104 may initiate this process of identifying additional data containers 128(1)-(N) in response to the determination that the amount of duplication between the additional data included in subsequent backup 122 and the data stored in data container 126(1)-(N) is below the predetermined threshold.

The various systems described herein may perform step 310 in a variety of ways. In one example, identification module 104 may identify additional data container 128(1) having been preallocated to store duplicate data within deduplicated storage system 124. For example, the backup application may preallocate additional data container 128(1) and leave additional data container 128(1) empty within deduplicated storage system 124. In this example, the backup application may configure additional data container 128(1) to store data duplicated in an existing data container whose container utilization would have been below the predetermined threshold of 60%. Identification module 104 may then identify additional container 128(1) within deduplicated storage system 124 in response to the determination that the amount of duplication between subsequent backup 122 and data container 126(1) is below the predetermined threshold of 60%.

In one example, identification module 104 may create additional data container 128(N) to store the other data included in subsequent backup 122 as duplicate data within deduplicated storage system 124. For example, identification module 104 may allocate additional data container 128(N) within deduplicated storage system 124. In this example, identification module 104 may configure additional data container 128(N) to store the other data included in subsequent backup 122 as duplicate data since the container utilization of the other data container in data containers 126(1)-(N) would have been below the predetermined threshold of 60%.

As illustrated in FIG. 3, at step 312 one or more of the systems described herein may store the additional data in the additional data container within the deduplicated storage system to facilitate increasing a restore speed of the subsequent backup. For example, at step 312 storage module 112 may, as part of client device 202 and/or deduplicated storage system 124 in FIG. 2, store the additional data in at least one of additional data containers 128(1)-(N) instead of deduplicating the additional data with respect to the data stored in data containers 126(1)-(N).

The systems described herein may perform step 312 in a variety of ways. In one example, storage module 112 may store the additional data in data container 128(1) as duplicate data since the container utilization of data container 126(1) would have been below the predetermined threshold of 60%. For example, storage module 112 may store data 400, 402, 408, 412, 414, 416 in additional data container 128(1) instead of deduplicating data 400, 402, and 408 with respect to the data stored in data container 126(1). In this example, by storing data 400, 402, and 408 in data container 128(1) as duplicate data, storage module 112 may increase the storage efficiency of the data containers storing the additional data included in subsequent backup 122 within deduplicated storage system 124.

Moreover, by increasing the storage efficiency of the data containers storing the additional data included in subsequent backup 122 within deduplicated storage system 124, storage module 112 may reduce the number of data containers needed to restore subsequent backup 122 from deduplicated storage system 124. By reducing the number of data containers needed to restore subsequent backup 122 from deduplicated storage system 124, storage module 112 may facilitate increasing the restore speed of subsequent backup 122.

In one example, storage module 112 may store the other data in data container 128(1) as duplicate data since the container utilization of the other data container in data containers 126(1)-(N) would have been below the predetermined threshold of 60%. For example, storage module 112 may store the other data in data container 128(N) as duplicate data instead of deduplicating the other data included in subsequent backup 122 with respect to the other data container in data containers 126(1)-(N). In this example, by storing the other data in data container 128(N) as duplicate data, storage module 112 may increase the storage efficiency of the data containers storing the other data included in subsequent backup 122 within deduplicated storage system 124.

In some examples, the systems and methods described herein may facilitate increasing the restore speed of backups in a variety of other ways. In one example, detection module 106 may detect a request to restore subsequent backup 122 to client device 202. For example, restore application 208 may issue request 212 to restore subsequent backup 122 to client device 202 in response to user input. In this example, detection module 106 may detect request 212 as restore application 208 issues request 212.

Figure 5:
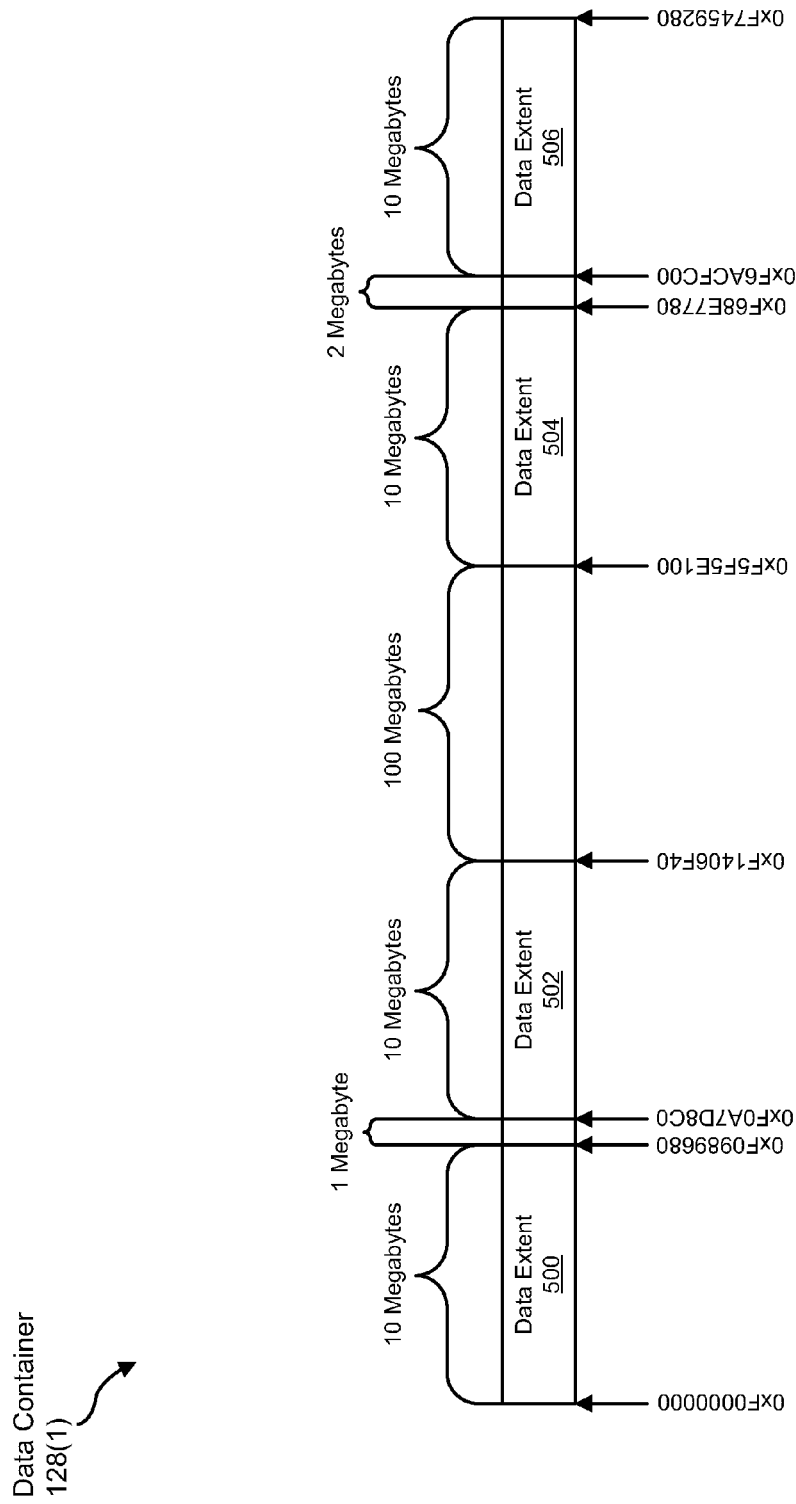
FIG. 5 is an illustration of a plurality of exemplary data extents included in a data container within a deduplicated storage system.

In one example, perfecting module 114 may prefetch at least a portion of subsequent backup 122 from deduplicated storage system 124 in response to the detection of request 212. For example, perfecting module 114 may identify data container 128(1) in FIG. 5 that is storing a plurality of data extents 500, 502, 504, and 506. In this example, prefetching module 114 may then determine that data extents 500, 502, 504, and 506 in FIG. 5 are included in and/or referenced by subsequent backup 122. Upon determining that data extents 500, 502, 504, and 506 in FIG. 5 are included in and/or referenced by subsequent backup 122, prefetching module 114 may determine that at least one subset of data extents 500, 502, 504, and 506 in FIG. 5 are adjacent to one another within data container 128(1).

In some examples, prefetching module 114 may identify a starting point and an ending point of each of data extents 500, 502, 504, and 506 within data container 128(1) in FIG. 5. In one example, prefetching module 114 may identify an address at which each of data extents 500, 502, 504, and 506 starts within data container 128(1) in FIG. 5. For example, prefetching module 114 may determine that data extent 500 starts at address "0xF0000000" and data extent 502 starts at address "0xF0A7D8C0" within data container 128(1) in FIG. 5. In this example, prefetching module 114 may also determine that data extent 504 starts at address "0xF5F5E100" and data extent 506 starts at address "0xF6ACFC00" within data container 128(1) in FIG. 5.

In one example, prefetching module 114 may also identify an address at which each of data extents 500, 502, 504, and 506 ends within data container 128(1) in FIG. 5. For example, prefetching module 114 may determine that data extent 500 ends at address "0xF0989680" and data extent 502 ends at address "0xF1406F40" within data container 128(1) in FIG. 5. In this example, prefetching module 114 may also determine that data extent 504 ends at address "0xF68E7780" and data extent 506 ends at address "0xF7459280" within data container 128(1) in FIG. 5.

In one example, prefetching module 114 may identify these ending points based at least in part on the starting points of data extents 500, 502, 504, and 506 and the number of bytes in data extents 500, 502, 504, and 506. For example, prefetching module 114 may identify "0xF0989680" and "0xF1406F40" as the respective addresses at which data extents 500 and 502 end within data container 128(1) in FIG. 5 by adding the 10 megabytes to the respective addresses at which data extents 500 and 502 start within data container 128(1) in FIG. 5. In this example, prefetching module 114 may also identify "0xF68E7780" and "0xF7459280" as the respective addresses at which data extents 504 and 506 end within data container 128(1) in FIG. 5 by adding the 10 megabytes to the respective addresses at which data extents 504 and 506 start within data container 128(1) in FIG. 5.

In some examples, prefetching module 114 may determine that data extents 500 and 502 are adjacent to one another within data container 128(1) in FIG. 5. In one example, prefetching module 114 may calculate a differential between the starting point of data extent 502 and the ending point of data extent 500. For example, prefetching module 114 may calculate a differential between data extents 500 and 502 within data container 128(1) in FIG. 5 by subtracting address "0xF0989680" from address "0xF0A7D8C0." In this example, prefetching module 114 may determine that the differential between data extents 500 and 502 is 1 megabyte based on the subtraction.

In one example, prefetching module 114 may calculate a differential between the starting point of data extent 506 and the ending point of data extent 504. For example, prefetching module 114 may calculate a differential between data extents 500 and 502 within data container 128(1) in FIG. 5 by subtracting address "0xF68E7780" from address "0xF6ACFC00." In this example, prefetching module 114 may determine that the differential between data extents 504 and 506 is 2 megabytes based on the subtraction.

In one example, prefetching module 114 may calculate a differential between the starting point of data extent 504 and the ending point of data extent 502. For example, prefetching module 114 may calculate a differential between data extents 502 and 504 within data container 128(1) in FIG. 5 by subtracting address "0xF1406F40" from address "0xF5F5E100." In this example, prefetching module 114 may determine that the differential between data extents 502 and 504 is 100 megabytes based on the subtraction.

Upon calculating these differentials, prefetching module 114 may determine that the differentials between data extents 500 and 502 and data extents 504 and 506 are below a predetermined threshold but the differential between data extents 502 and 504 are above the predetermined threshold. This predetermined threshold may include any type or form of amount (e.g., number of bytes) used as a comparative measurement for determining whether data extents are adjacent to one another within data container 128(1).

In one example, prefetching module 114 may locate the predetermined threshold in a database. For example, prefetching module 114 may locate the predetermined threshold in a database within deduplicated storage system 124 or client device 202. In this example, upon locating the predetermined threshold in the database, prefetching module 114 may determine that the predetermined threshold is 3 megabytes.

In one example, prefetching module 114 may compare the differentials between data extents 500 and 502 and data extents 504 and 506 with the predetermined threshold. For example, prefetching module 114 may compare the 1-megabyte differential between data extents 500 and 502 and the 2-megabyte differential between data extents 504 and 506 with the predetermined threshold of 3 megabytes. In this example, prefetching module 114 may then determine that the 1-megabyte and 2-megabyte differentials are below the predetermined threshold of 3 megabytes based on the comparison.

Upon determining that the 1-megabyte and 2-megabyte differentials are below the predetermined threshold of 3 megabytes, prefetching module 114 may cache data extents 500 and 502 and data extents 504 and 506 to facilitate increasing the restore speed of subsequent backup 122. For example, prefetching module 114 may read data extents 500 and 502 from data container 128(1) in FIG. 5 with a single read instruction. In this example, prefetching module 114 may read all of the data stored between addresses "0xF0000000" and "0xF1406F40" within data container 128(1) in FIG. 5 with a single read instruction. Prefetching module 114 may then store all of this data (including data extents 500 and 502) in cache 210 located on deduplicated storage system 124 in FIG. 2.

In another example, prefetching module 114 may read data extents 504 and 506 from data container 128(1) in FIG. 5 with a single read instruction. For example, prefetching module 114 may read all of the data stored between addresses "0xF5F5E100" and "0xF7459280" within data container 128(1) in FIG. 5 with a single read instruction. In this example, prefetching module 114 may determine that the 2-megabyte differential between data extents 504 and 506 is not needed to restore subsequent backup 122. As a result, prefetching module 114 may discard the 2-megabyte differential between data extents 504 and 506 instead of storing this unneeded data in cache 210.

In one example, prefetching module 114 may compare the differential between data extents 502 and 504 with the predetermined threshold. For example, prefetching module 114 may compare the 100-megabyte differential between data extents 502 and 504 with the predetermined threshold of 3 megabytes. In this example, prefetching module 114 may then determine that the 100-megabyte differential is below the predetermined threshold of 3 megabytes based on the comparison. As a result, prefetching module 114 may forego reading data extents 502 and 504 from data container 128(1) in FIG. 5 with a single read instruction.

In some examples, detection module 106 may detect a restore operation performed by restore application 208 in response to request 212 to restore subsequent backup 122 to client device 202. In one example, detection module 106 may detect a need of restore application 208 to read data extents 500, 502, 504, and 506. For example, detection module 106 may determine that restore application 208 currently needs or will soon need data extents 500, 502, 504, and 506 to facilitate restoring subsequent backup 122 to client device 202. In this example, detection module 106 may then direct restore application 208 to search cache 210 for data extents 500, 502, 504, and 506 instead of reading these data extents from data container 128(1) within deduplicated storage system 124.

In one example, determination module 110 may determine that restore application 208 has read data extents 500, 502, 504, and 506 from cache 210 while performing the restore operation. In this example, determination module 110 may remove data extents 500, 502, 504, and 506 from cache 210 in response to determining that restore application 208 has read these data extents from cache 210. By removing these data extents from cache 210, determination module 110 may free up at least a portion of cache 210 to store additional data extents that have been or will soon be prefetched from one or more data containers within deduplicated storage system 124.

As explained above in connection with system 200 in FIG. 2 and method 300 in FIG. 3, the systems and methods described herein may increase the restore speeds of backups stored in deduplicated storage systems. For example, by calculating the amount of duplication (or container utilization) between a backup and a previously used data container within a deduplicated storage system, SYMANTEC BACKUP EXEC may selectively store at least a portion of the backup as duplicate data in a new data container in the event that the amount of duplication between the backup and the previously used data container is below a predetermined threshold. By selectively storing the portion of the backup as duplicate data in the new data container in the event that the amount of duplication between the backup and the previously used data container is below the predetermined threshold, SYMANTEC BACKUP EXEC may increase the storage efficiency of the data containers storing the data included in the backup within the deduplicated storage system.

In addition, by increasing the storage efficiency of the data containers storing the data included in the backup within the deduplicated storage system, SYMANTEC BACKUP EXEC may reduce the number of data containers needed to restore the backup from the deduplicated storage system. By reducing the number of data containers needed to restore the backup from the deduplicated storage system, SYMANTEC BACKUP EXEC may increase the restore speed of the backup.

Moreover, by prefetching adjacent portions of the backup from a data container within the deduplicated storage system during a restore operation, SYMANTEC BACKUP EXEC may reduce the number of read operations needed to restore the backup from the deduplicated storage system. By reducing the number of read operations needed to restore the backup from the deduplicated storage system, SYMANTEC BACKUP EXEC may increase the restore speed of the backup.

In addition, by combining these techniques upon backing up and restoring the backup, SYMANTEC BACKUP EXEC may achieve unexpected and/or unpredictable increases in the restore speed of the backup. For example, by implementing only the technique of selectively storing duplicate data in the event that the amount of duplication between the backup and the previously used data container is below a predetermined threshold, SYMANTEC BACKUP EXEC may increase the restore speed of the backup from 33 megabytes per second (MB/sec) to 77 MB/sec.

In another example, by implementing only the technique of prefetching adjacent portions of the backup from the data container within the deduplicated storage system during the restore operation, SYMANTEC BACKUP EXEC may increase the restore speed of the backup from 33 MB/sec to 140 MB/sec. However, by combining the techniques of selectively storing duplicate data during the backup operation and prefetching adjacent portions of the backup during the restore operation, SYMANTEC BACKUP EXEC may increase the restore speed of the backup from 33 MB/sec to 600 MB/sec (an increase of approximately 18-fold).

Figure 6:
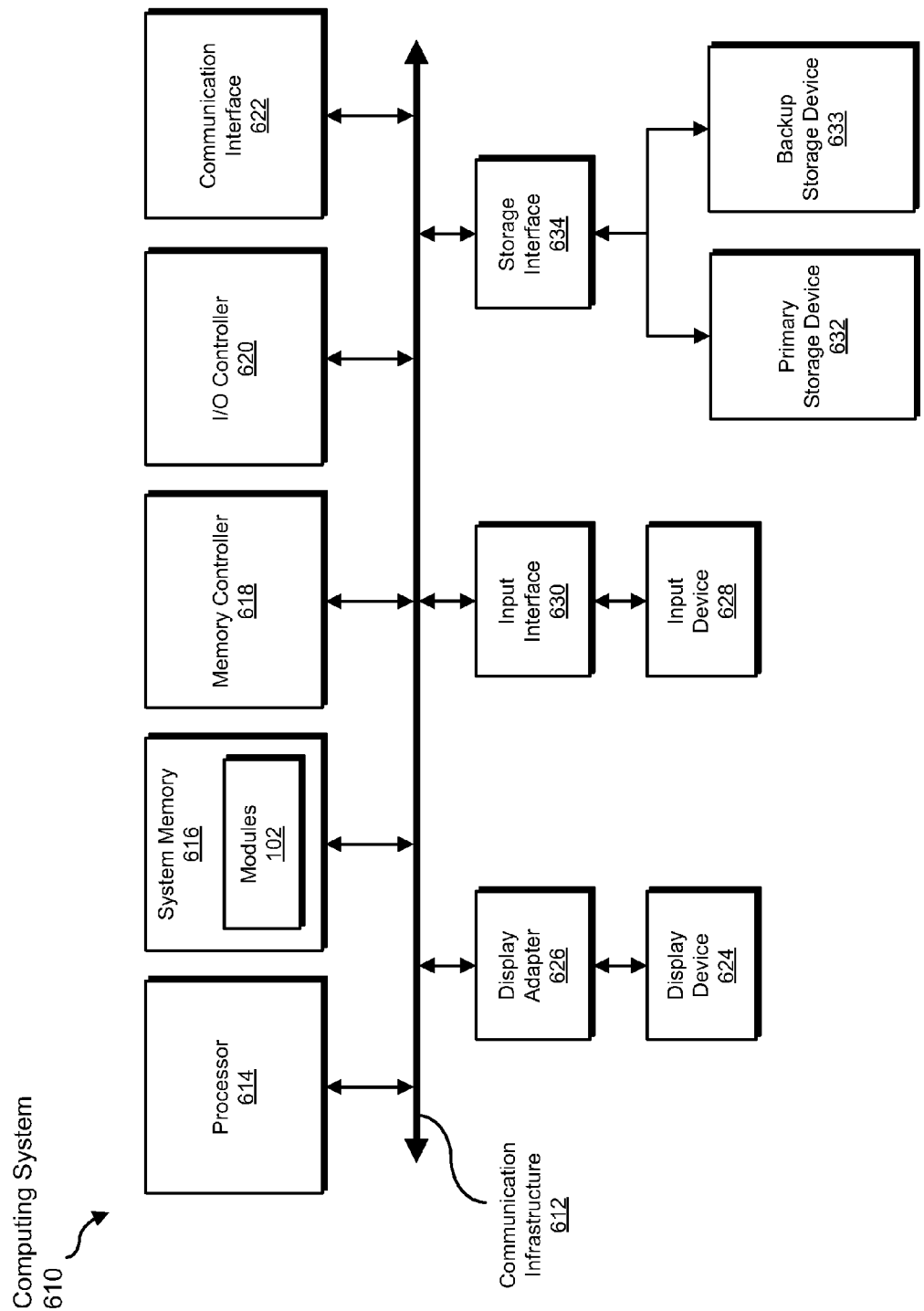
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, detecting, calculating, determining, storing, detecting, prefetching, caching, reading, discarding, directing, removing, maintaining, and reducing steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
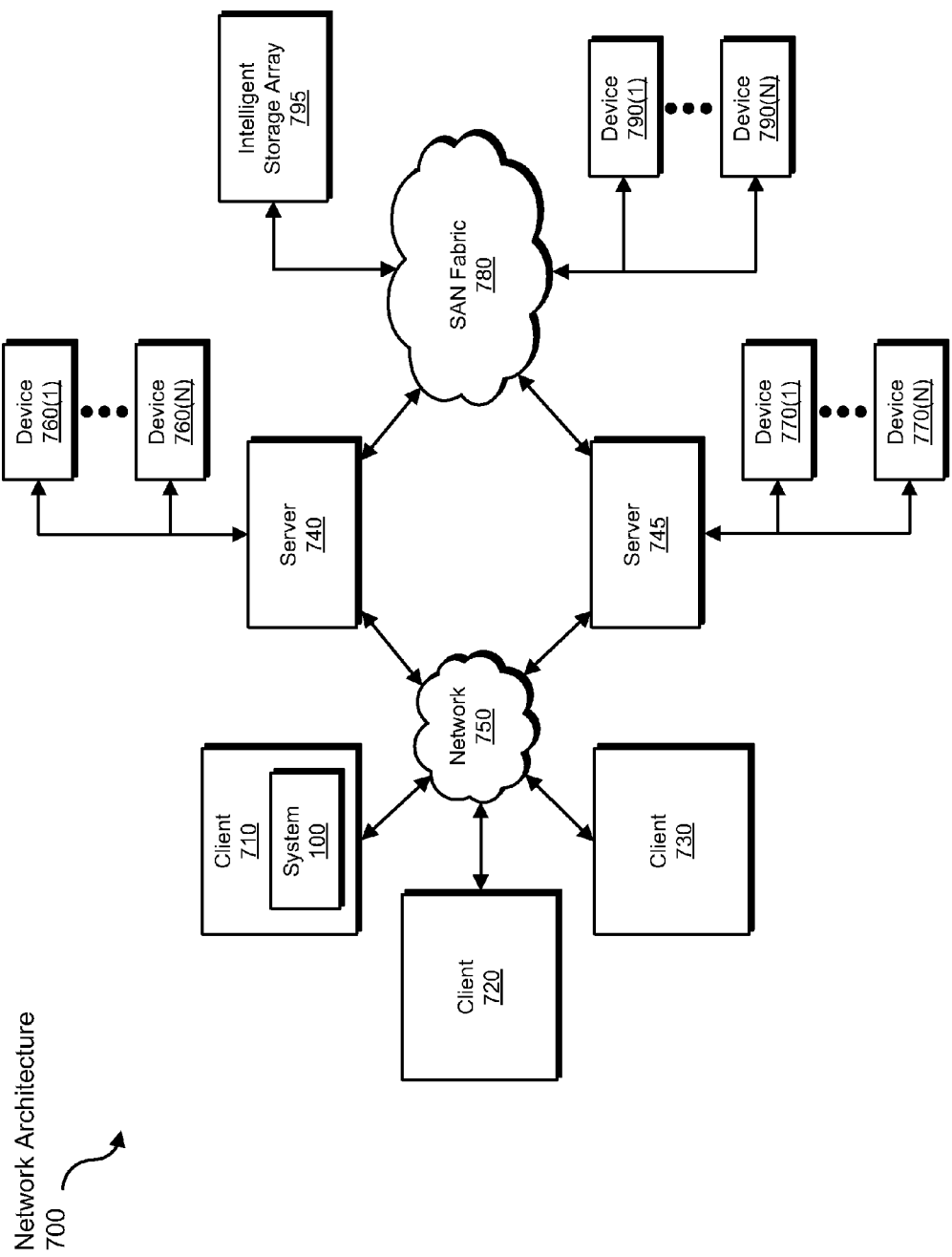
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, detecting, calculating, determining, storing, detecting, prefetching, caching, reading, discarding, directing, removing, maintaining, and reducing steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for increasing restore speeds of backups stored in deduplicated storage systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a backup to be transformed, transform the backup, output a result of the transformation to facilitate restoring the backup, use the result of the transformation to facilitate increasing the restore speed of the backup, and store the result of the transformation to a cache accessible to the device being restored from the backup. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for increasing restore speeds of backups stored in deduplicated storage systems, at least a portion of the method being performed by a computing device comprising at least one processor, the method comprising:

identifying a backup that comprises data stored in at least one data container within a deduplicated storage system;

detecting a subsequent backup that comprises additional data that is identical to at least a portion of the data stored in the data container;

calculating an amount of duplication between the additional data included in the subsequent backup and the data stored in the data container, wherein the amount of duplication represents the amount of data stored in the data container that is identical to the additional data included in the subsequent backup relative to the total amount of data stored in the data container;

determining that the amount of duplication between the additional data included in the subsequent backup and the data stored in the data container is below a predetermined threshold;

in response to determining that the amount of duplication is below the predetermined threshold:

identifying at least one additional data container within the deduplicated storage system to store the additional data included in the subsequent backup instead of deduplicating the additional data with respect to the data stored in the data container;

storing the additional data in the additional data container within the deduplicated storage system to facilitate increasing a restore speed of the subsequent backup;

detecting a request to restore the subsequent backup to a client device;

in response to detecting the request to restore the subsequent backup to the client device, prefetching at least a portion of the subsequent backup from the deduplicated storage system to facilitate increasing the speed at which the subsequent backup is restored to the client device, wherein prefetching the portion of the subsequent backup comprises caching a subset of adjacent data extents from a data container that comprises a plurality of data extents included in the subsequent backup by:

reading the subset of adjacent data extents from the data container with a single read operation;

upon reading the subset of adjacent data extents with the single read operation, storing the subset of adjacent data extents in a cache accessible to the client device to facilitate increasing the speed at which the subsequent backup is restored to the client device.

2. The method of claim 1, wherein caching the subset of adjacent data extents comprises:

identifying the data container that comprises the plurality of data extents included in the subsequent backup;

determining that a subset of the data extents are adjacent to one another within the data container.

3. The method of claim 1, wherein prefetching the portion of the subsequent backup from the deduplicated storage system comprises:

determining that another subset of the data extents are adjacent to one another within the data container;

upon determining that the other subset of data extents are adjacent to one another, caching the other subset of adjacent data extents to facilitate increasing the speed at which the subsequent backup is restored to the client device.

4. The method of claim 2, wherein determining that the subset of data extents are adjacent to one another within the data container comprises:

identifying a starting point of at least one data extent included in the subsequent backup within the data container;

identifying an ending point of at least one other data extent included in the subsequent backup within the data container;

calculating a differential between the starting point of the data extent and the ending point of the other data extent within the data container;

determining that the differential between the starting point of the data extent and the ending point of the other data extent is below a predetermined threshold.

5. The method of claim 1, wherein caching the subset of adjacent data extents comprises:

reading a portion of data that is not needed to restore the subsequent backup from the data container with the single read operation;

upon reading the unneeded portion of data with the single read operation, discarding the unneeded portion of data instead of storing the unneeded portion of data in the cache.

6. The method of claim 1, further comprising:

detecting a restore operation performed by a restore application in response to the request to restore the subsequent backup to the client device;

directing the restore application to search the cache for the subset of data extents included in the subsequent backup instead of reading the subset of data extents from the data container within the deduplicated storage system.

7. The method of claim 6, wherein directing the restore application to search the cache for the subset of data extents included in the subsequent backup comprises:

while the restore application is performing the restore operation, detecting a need of the restore application to read the subset of data extents;

in response to detecting the need of the restore application to read the subset of data extents, directing the restore application to search the cache for the subset of data extents included in the subsequent backup instead of reading the subset of data extents from the data container within the deduplicated storage system.

8. The method of claim 6, further comprising:

determining that the restore application has read the subset of data extents from the cache while performing the restore operation;

in response to determining that the restore application has read the subset of data extents from the cache, removing the subset of data extents from the cache.

9. The method of claim 1, wherein calculating the amount of duplication between the additional data included in the subsequent backup and the data stored in the data container comprises:

comparing the additional data included in the subsequent backup with the data stored in the data container;

determining that the portion of data stored in the data container is identical to the additional data included in the subsequent backup.

10. The method of claim 1, wherein determining that the amount of duplication is below the predetermined threshold comprises determining that the portion of data stored in the data container that is identical to the additional data included in the backup is below the predetermined threshold.

11. The method of claim 1, wherein storing the additional data in the additional data container within the deduplicated storage system comprises maintaining duplicate instances of data across the data container and the additional data container within the deduplicated storage system to facilitate increasing the restore speed of the subsequent backup.

12. The method of claim 11, wherein maintaining the duplicate instances of data across the data container and the additional data container comprises reducing an amount of data containers needed to restore the subsequent backup by storing all of the additional data in the additional data container since the amount of duplication is below the predetermined threshold.

13. The method of claim 1, wherein calculating the amount of duplication between the additional data included in the subsequent backup and the data stored in the data container comprises calculating a percentage or ratio that represents the amount of duplication between the additional data included in the subsequent backup and the data stored in the data container.

14. A system for increasing restore speeds of backups stored in deduplicated storage systems, the system comprising:
an identification module, stored in memory, that identifies a backup that comprises data stored in at least one data container within a deduplicated storage system;
a detection module, stored in memory, that detects a subsequent backup that comprises additional data that is identical to at least a portion of the data stored in the data container;
a calculation module, stored in memory, that calculates an amount of duplication between the additional data included in the subsequent backup and the data stored in the data container, wherein the amount of duplication represents the amount of data stored in the data container that is identical to the additional data included in the subsequent backup relative to the total amount of data stored in the data container;
a determination module, stored in memory, that determines that the amount of duplication between the additional data included in the subsequent backup and the data stored in the data container is below a predetermined threshold;
wherein the identification module further identifies an additional data container within the deduplicated storage system to store the additional data included in the subsequent backup in response to the determination that the amount of duplication is below the predetermined threshold;
a storage module, stored in memory, that stores the additional data in the additional data container within the deduplicated storage system to facilitate increasing a restore speed of the subsequent backup;
a prefetching module, stored in memory, that prefetches at least a portion of the subsequent backup from the deduplicated storage system to facilitate increasing the speed at which the subsequent backup is restored to a client device, wherein prefetching the portion of the subsequent backup comprises caching a subset of adjacent data extents from a data container that comprises a plurality of data extents included in the subsequent backup by:
reading the subset of adjacent data extents from the data container with a single read operation;
upon reading the subset of adjacent data extents with the single read operation, storing the subset of adjacent data extents in a cache accessible to the client device to facilitate increasing the speed at which the subsequent backup is restored to the client device;
at least one physical processor that executes the identification module, the detection module, the calculation module, the determination module, the storage module, and the prefetching module.

15. The system of claim 14, wherein the prefetching module further:
identifies the data container that comprises the plurality of data extents included in the subsequent backup;
determines that a subset of the data extents are adjacent to one another within the data container.

16. The system of claim 14, wherein the prefetching module further:
determines that another subset of the data extents are adjacent to one another within the data container;
caches, upon determining that the other subset of data extents are adjacent to one another, the other subset of adjacent data extents to facilitate increasing the speed at which the subsequent backup is restored to the client device.

17. The system of claim 16, wherein the prefetching module further:
identifies an address of at least one data extent included in the subsequent backup within the data container;
identifies an address of at least one other data extent included in the subsequent backup within the data container;
calculates a differential between the address of the data extent and the address of the other data extent within the data container;
determines that the differential between the address of the data extent and the address of the other data extent is below a predetermined threshold.

18. The system of claim 14, wherein the calculation module calculates a percentage or ratio that represents the amount of duplication between the additional data included in the subsequent backup and the data stored in the data container.

19. A non-transitory computer-readable-storage medium comprising one or more computer-executable instructions that, when executed by at least one processor of a computing device, cause the computing device to:
identify a backup that comprises data stored in at least one data container within a deduplicated storage system;
detect a subsequent backup that comprises additional data that is identical to at least a portion of the data stored in the data container;
calculate an amount of duplication between the additional data included in the subsequent backup and the data stored in the data container, wherein the amount of duplication represents the amount of data stored in the data container that is identical to the additional data included in the subsequent backup relative to the total amount of data stored in the data container;
determine that the amount of duplication between the additional data included in the subsequent backup and the data stored in the data container is below a predetermined threshold;

in response to determining that the amount of duplication is below the predetermined threshold:
  identify an additional data container within the deduplicated storage system to store the additional data included in the subsequent backup instead of deduplicating the additional data with respect to the data stored in the data container;
  store the additional data in the additional data container within the deduplicated storage system to facilitate increasing a restore speed of the subsequent backup;
detect a request to restore the subsequent backup to a client device;
prefetch, in response to detecting the request to restore the subsequent backup to the client device, at least a portion of the subsequent backup from the deduplicated storage system to facilitate increasing the speed at which the subsequent backup is restored to the client device, wherein prefetching the portion of the subsequent backup comprises caching a subset of adjacent data extents from a data container that comprises a plurality of data extents included in the subsequent backup by:
  reading the subset of adjacent data extents from the data container with a single read operation;
  upon reading the subset of adjacent data extents with the single read operation, storing the subset of adjacent data extents in a cache accessible to the client device to facilitate increasing the speed at which the subsequent backup is restored to the client device.

* * * * *